J. E. MARTIN.

GLOBE HOLDER.

APPLICATION FILED JUNE 24, 1911.

Reissued Nov. 28. 1911.

13,324.

3 SHEETS—SHEET 1.

Witnesses
L. H. Grote
M. E. Keir

Inventor:
J. E. Martin

By Howson and Howson Attys

J. E. MARTIN.

GLOBE HOLDER.

APPLICATION FILED JUNE 24, 1911.

Reissued Nov. 28, 1911. 13,324.

3 SHEETS—SHEET 2.

WITNESSES:

M. E. Keir

L. H. Grote

INVENTOR

J. E. Martin

BY

Howson and Howson his ATTORNEYS

J. E. MARTIN.

GLOBE HOLDER.

APPLICATION FILED JUNE 24, 1911.

Reissued Nov. 28, 1911. 13,324.

3 SHEETS—SHEET 3.

Witnesses
W. E. Keir
L. H. Grote

Inventor:
J. E. Martin
By Howson and Howson Attys.

UNITED STATES PATENT OFFICE.

JOSEPH E. MARTIN, OF KANSAS CITY, MISSOURI, ASSIGNOR TO THE BRYANT ELECTRIC COMPANY, OF BRIDGEPORT, CONNECTICUT, A CORPORATION OF CONNECTICUT.

GLOBE-HOLDER.

13,324. Specification of Reissued Letters Patent. Reissued Nov. 28, 1911.

Original No. 977,892, dated December 6, 1910, Serial No. 566,294. Application for reissue filed June 24, 1911. Serial No. 635,227.

*To all whom it may concern:*

Be it known that I, JOSEPH E. MARTIN, a citizen of the United States, residing in Kansas City, in the county of Jackson, in the State of Missouri, have invented certain new and useful Improvements in Globe-Holders, of which the following is a specification.

This invention relates to globe holders, and more especially to devices for securing globes to gas or electric light fixtures or brackets, and my object is to produce a simple and cheap device for attachment to the globe receiving collar of a fixture or bracket and the reception of the neck of the globe to support the same in a fixture of the inverted type and as an anchor for the globe if the fixture is of the upright type.

With this object in view, the invention consists in certain novel and peculiar features of construction and organization as hereinafter described and claimed, and in order that it may be fully understood reference is to be had to the accompanying drawings, in which—

Figure 1:
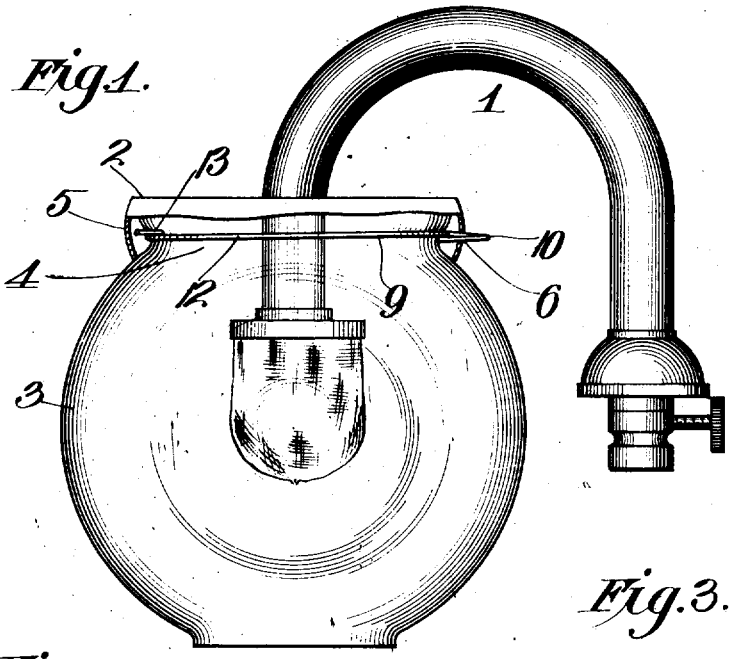
Figure 3:
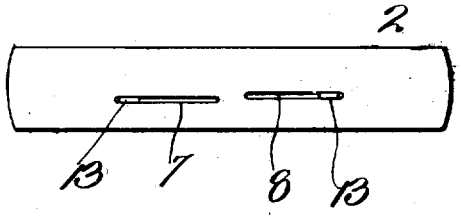
Figure 2:
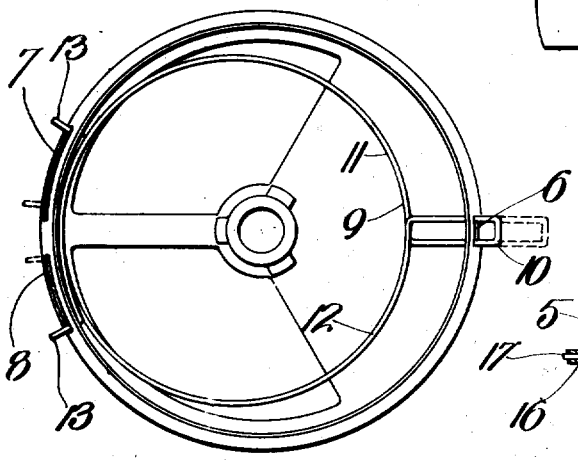
Figure 6:
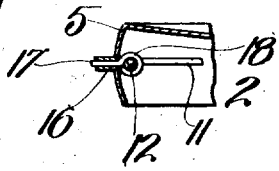
Figure 7:
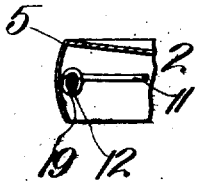
Figure 4:
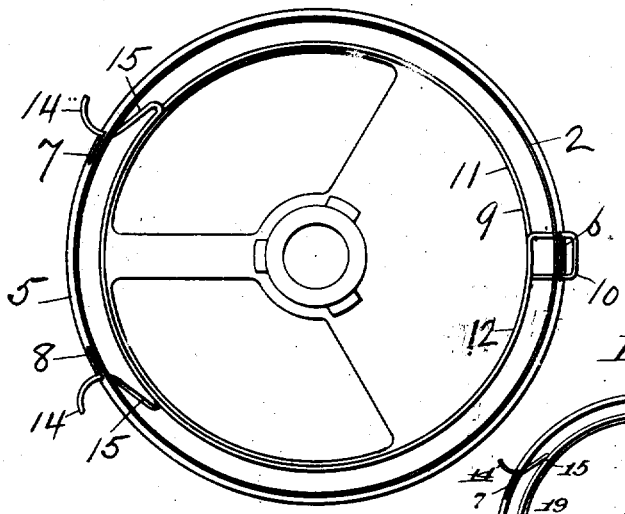
Figure 10:
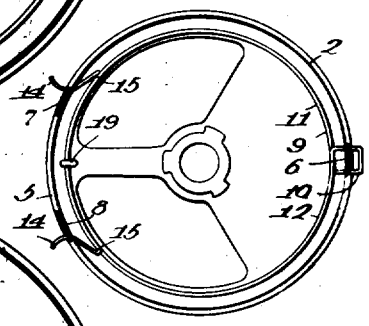
Figure 5:
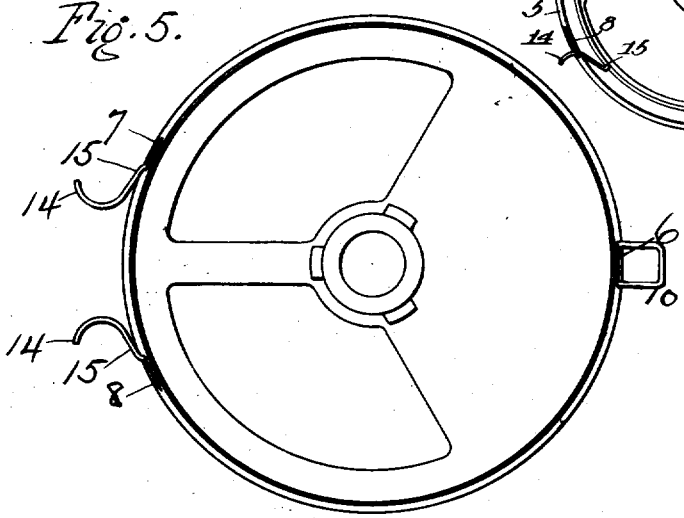
Figure 8:
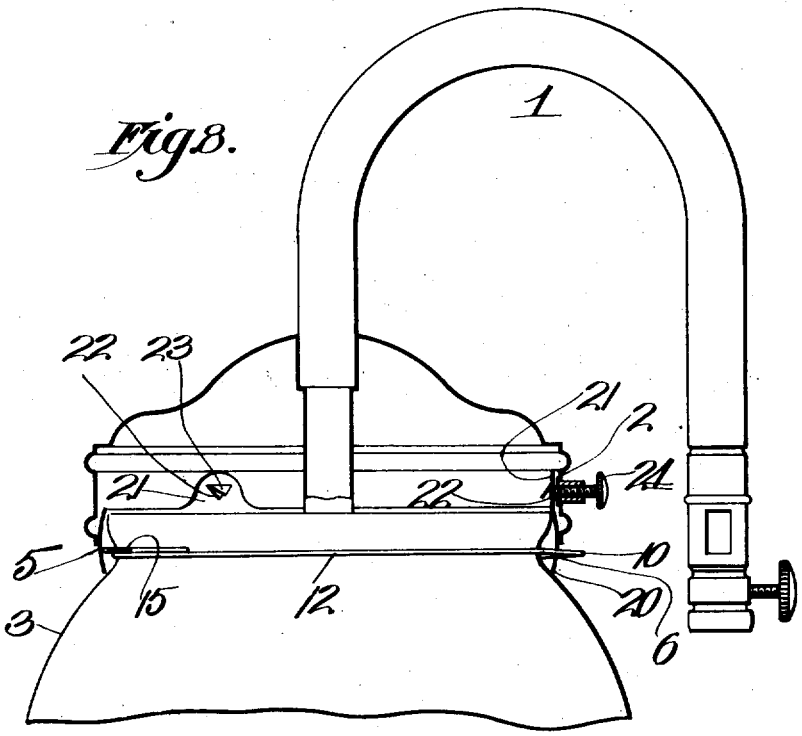
Figure 9:
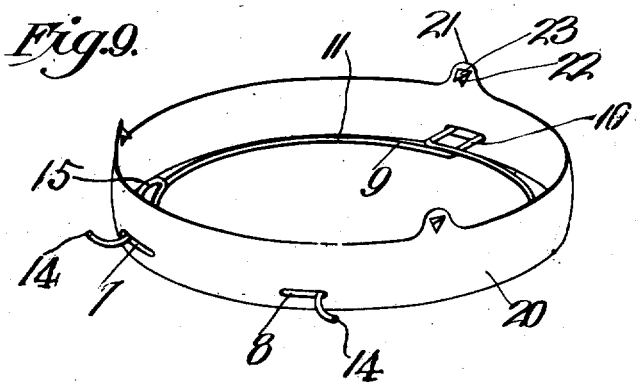

Figure 1, is a side elevation of a fixture of the inverted type equipped with a globe-holder embodying my invention, the collar of the fixture being broken away to expose more clearly the relation between the globe and the holder. Fig. 2, is an inverted plan view of the collar of the fixture with the globe omitted, and the holder in contracted condition. Fig. 3, is an edge view of the collar of the fixture as viewed from the front and showing the free or handle ends of the holder. Fig. 4, is an inverted plan view of the collar of a light fixture equipped with a different form of holder. Fig. 5, is a similar view showing the holder expanded. Fig. 6, is a vertical section taken through the front part of the collar when equipped with a slidable guide to assist in preventing the sagging of the holder. Fig. 7, is a similar view of a second modification for accomplishing the same purpose. Fig. 8, is a sectional view of the "inverted" fixture provided with a supplemental collar equipped with the holder. Fig. 9, is a perspective view of the supplemental collar equipped with the holder. Fig. 10 is an inverted plan view of the globe-holder provided with the ring-holding means of Fig. 7.

In the said drawings, 1 indicates a gas fixture of the inverted type, 2 the collar thereof of the usual or any preferred form, and 3 the globe having the customary contracted neck 4 to be encircled by the flange or wall 5 of the collar, provided at what may be termed its rear side, with a short horizontal slot 6, and at its front side with horizontal slots 7 and 8, the latter being at opposite sides of a point diametrically opposite the slot 6.

The holder is of spring wire bent to form a coil or convolution 9, the central portion of the wire being bent to form an arm 10, which projects radially outward from the coil and by preference, is of rectangular form as shown in Fig. 2, so that the rear ends of the two arms 11 and 12 of coil 9 shall overlap. At the opposite side of the coil from arm 10 said arms 11 and 12 normally overlap for a considerable distance, the preferred construction being to have the front end of arm 11 underlie the corresponding end of arm 12, it being noticed that at the opposite side of the coil the arm 11 overlies arm 12. The front end of each arm is provided with an outwardly projecting terminal 13.

To apply the holder it is arranged at a slight angle and while so held the terminals of arms 11 and 12 are slipped outwardly through slots 7 and 8, respectively, of the collar. The opposite side of the holder is then swung upward and slid rearward to cause arm 10 to project through slot 6. The holder then occupies the position shown most clearly by Fig. 2, that is to say, the terminals 13 bear against the remote ends of the slots 7 and 8, respectively, as shown by Fig. 3.

To secure a globe in position, the operator grasps it in one hand and with the other hand presses the terminals 13 toward the inner ends of the slots 7 and 8 and thus expands the coil until it is large enough to permit the neck end of the globe to be passed through it as such end is fitted in the collar. The said terminals are then released and the holder contracts and snugly embraces the neck of the globe as shown clearly in Fig. 1. By having the opposite ends of the oppositely bowed portions of the holder in overlapping relation the globe is held in a vertical position because the said arms of the holder cannot sag under the weight of the globe, this result being more efficiently retained because the arm which overlaps at one side underlaps at the other. The slots 7 and 8 are preferably arranged in different horizontal planes as shown in Fig. 3, to assist in preventing the front ends of the arms of the holder from crossing, as experience has shown they will frequently do if the slots are in the same horizontal plane, and when crossed one arm at the crossing point lies inward of the other and thus prevents the latter adjacent to the crossing point from coming in contact with the globe and leaves the latter free to have a vibratory movement imperceptible to the eye but sufficient to cause a slight rattling at times.

In Figs. 4 and 5, the overlapping arms of the holder are provided with angle-shaped terminals consisting of radial portions 14 corresponding to portions 13 of Figs. 1 to 3 inclusive, and forwardly converging portions 15, the converging portions being adapted to act as cams upon the inner ends of the slots 7 and 8, when the portions 14 are pressed together so that by engagement with the collar at the inner ends of the slots, they shall compel the overlapping ends of the coil as it expands, to move forwardly, the arm 10 through the expansion of the coil moving radially in a rearward direction (see Fig. 5). When the pressure is removed the coil retracts to the position shown in Fig. 4, with the doubled-back portions 15 lying within and bearing against the collar at or near the outer ends of the slots 7 and 8.

In Fig. 6, I show a guide to assist in preventing the sagging of the holder, said guide consisting of a bushing 16 secured in the collar and slidable in the bushing is a pin 17, provided with an eye 18, encircling the overlapping arms of the coil.

In Fig. 7, a second form of guide is shown, consisting of a loop 19 encircling the overlapped arms to prevent the sagging of th coil and thus insure extended contact in the coil with the globe and the support of the latter in a vertical position.

To apply the holder to light fixtures as at present manufactured, I have provided a supplemental collar 20, shown in Figs. 8 and 9, having slots 6, 7 and 8 respectively receive the arm 10 and terminals 13 of the coil, and upwardly projecting ears 21, preferably three in number and provided with openings 22 formed by stamping out of said ears the tongues 23, or said openings may be otherwise formed. This collar 20 is adapted to be of diameter to be encircled by the collar 2 of the light fixture, and the openings 22 so disposed as to register with the threaded bushings 25 through which the clamping screws 24 are adjusted to enter said openings 22 and clamp the collar 20 securely within the collar 2.

From the above description it will be apparent that I have produced a globe holder possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent is:

1. The combination with a collar, of a holder consisting of a piece of resilient material bent to form a coil embodying overlapping arms terminating in doubled-back terminals extending convergingly outward through the collar at a suitable distance apart and adapted when pressed toward each other to bear against the collar and be caused thereby to effect the expansion of the coil.

2. The combination with a collar, of a holder consisting of a piece of resilient material bent to form a coil, embodying overlapping arms terminating in doubled-back terminals consisting of inner portions extending convergingly outward and handle portions at the outer ends of said inner portions; said terminals extending through the collar at a suitable distance apart and so arranged that when pressed toward each other the said outwardly converging portions shall bear against the collar and effect the expansion of the coil, and an arm projecting from the coil at a suitable point, slidingly through the collar and adapted to slide outwardly thereof as the coil is expanded.

3. The combination with a light fixture having a collar, and a globe to fit at one end within said collar and of less diameter than such end at a point encircled by the collar, of a holder of spring material bent to form a coil and provided at its end with terminals projecting outwardly through the collar and between its ends with an arm projecting outwardly through the collar, and means slidingly receiving the ends of the coil between said terminals for preventing sagging of the coil.

4. The combination with a light fixture having a collar, and a globe to fit at one end within said collar and of less diameter than such end at a point encircled by the collar, of a holder of spring material bent to form a coil and provided at its ends with terminals projecting outwardly through the collar and between its ends with an arm projecting outwardly through the collar, and a loop fitting loosely around both ends of the coil between said terminals.

5. The combination with a light fixture provided with a collar and set screws mounted radially therein, of a collar to fit within the first-named collar and adapted to be clamped therein by said set screws, of a holder consisting of a piece of resilient material bent to form a coil with overlapping ends and provided at the extremities of said overlapped ends with terminals extending convergingly outward through the collar at a suitable distance apart and adapted when pressed toward each other to bear against the collar and be caused thereby to effect the expansion of the coil.

6. The combination with the collar of a light fixture, of a shade or globe holder comprising a piece of resilient material bent to form a coil embodying overlapping arms terminating in doubled-back portions located within and bearing against the collar, the overlapping ends having projecting handle portions, substantially as described.

7. The combination with the collar of a light fixture, of a holder consisting of a piece of resilient material bent to form a coil, an intermediate portion of the coil being supported at one side of the collar, and the ends of the coil at the other side of the collar being provided with doubled-back portions lying within and bearing on the collar and having handle extensions projecting through slots in the collar, substantially as described.

In testimony whereof I affix my signature, in the presence of two witnesses.

JOSEPH E. MARTIN.

Witnesses:

HELEN C. RODGERS,

GEORGE Y. THORPE.